Patented May 17, 1949

2,470,529

UNITED STATES PATENT OFFICE 2,470,529

PESTICIDAL COMPOSITION OF POLY-ETHYLENE POLYSULFIDE AND NICOTINE SULFATE

William D. Stewart, Yonkers, N. Y., assignor to The B. F. Goodrich Company, New York, N. Y., a corporation of New York No Drawing. Application June 13, 1945, Serial No. 599,317

1 Claim. (Cl. 167—24)

This invention relates to pest control compositions and more particularly to compositions which are useful as fungicides.

This invention has for its general object the provision of new and useful compositions having the power of killing or inhibiting the growth of economically or physiologically harmful pests such as fungi which prey on plant and animal matter either in its animate, inanimate or fabricated state. Other objects will appear hereinafter.

These objects are accomplished by the following invention of pesticidal compositions comprising as an essential active ingredient an organic polysulfide polymer of high molecular weight.

These organic polysulfide polymers of high molecular weight can be prepared by any of the methods described in the literature or prior patents, although it is preferred to prepare them and use them in the form of aqueous dispersions or emulsions commonly referred to as latices.

These aqueous dispersions or emulsions of organic polysulfide polymers may be prepared by reacting a disubstituted organic compound such as an alkylene dihalide or a dihalo-ether with a water-soluble polysulfide in the presence of freshly precipitated magnesium hydroxide as described in U. S. Re. 19,207 and others by Patrick or they can be prepared by reacting an organic dihalide with a water-soluble polysulfide in the presence of a salt-stable long chain emulsifying agent. As suitable emulsifying agents, I may employ any salt-stable long chain compound having a hydrophobic group as one component of the long chain and a hydrophylic group as the other. The emulsifying agents preferred for the formation of latices of small particle size are those having a high molecular weight hydrophobic group as the major part of the compound and a small or low molecular weight hydrophilic group as the minor part. Compounds which are most suitable for stable latex formation are the lignin sulfonates such as calcium and sodium lignin sulfonates, alkyl benzene sulfonates having more than 20 carbon atoms in the alkyl group, aryl alkyl sulfonates, sorbitan monolaurates especially those which are oil-soluble and slightly water-soluble, and others.

The latices, dispersions and/or emulsions which are preferred are those prepared in the presence of an emulsifying agent such as a sulfonate. The following is an example of the preparation of these aqueous emulsions. To 300 ml. of a 2-molar solution of sodium polysulfide which contains 4 to 5 sulfur atoms per molecule is added 6 grams of sodium lignin sulfonate and 60 ml. of ethylene dichloride. This mixture is then homogenized by four passes through a laboratory "hand-homogenizer." The homogenized mixture is put in a reaction flask fitted with a stirrer. The reaction flask is placed in a controlled temperature bath to maintain the reaction temperature at 40 to 55° C. The reaction is complete within three hours. The finely divided particles are dense, but in spite of this remain suspended over a long period of time. However, if it is desired to eliminate the time lost in waiting for the particles to settle, the settling may be accelerated by flocculating with aluminum sulfate, calcium nitrate, salts of such metals as zinc, copper, cobalt, cadmium, etc., and others. The particles agglomerate to form uniform spherical clumps 1-3 microns in diameter which settle rapidly. The polymer is washed with warm and cold water to remove the salts present, a procedure which is very desirable when the dispersion is to be employed as a fungicide. The polymer redisperses readily in water with a minimum of agitation.

Any of the alkali and alkaline earth polysulfides which are water-soluble may be used in the preparation of the organic polysulfides, such as potassium, sodium, barium and calcium polysulfides with substantially the same results.

As has been pointed out in the literature and prior patents, a wide range of disubstituted organic compounds may be employed in carrying out the reaction such as ethylene dibromide, propylene dichloride or dibromide as well as dihalides of mixtures of alkylenes such as secured by the formation of unsaturated hydrocarbon gases derived from pressure-cracking processes, natural gas-cracking processes, and the like. Dihalo-ethers will also react with the water-soluble polysulfides to produce their corresponding polysulfide polymers.

For economic reasons, the ethylene polysulfide polymers, prepared essentially as described above, are the organic polysulfides preferred for use as fungicides.

I have discovered that these organic polysulfide polymers are highly effective fungicides employed in the laboratory as aqueous dispersions as dilute as 100 p. p. m. but effective in higher concentrations as when applied in the field at 0.1 to 0.25% as a fungicide and also as a carrier of insecticides for it may be considered as a "sticker" for spray materials since it does not wash-off leaf during rain.

These organic polysulfide polymers with which this invention is concerned were tested to determine their pesticidal activity according to those methods commonly employed and understood by those familiar with the art of testing pesticidal compositions.

The more detailed practice of the invention is illustrated by the following examples and descriptions. They illustrate the application of the specific organic polysulfide polymer, polymeric ethylene polysulfide having a sulfur content of 80 to 85%. These examples are intended to be illustrative and not limiting. In each test, various amounts of the specific polysulfide polymer were employed, but only those tests which illustrate the remarkable effectiveness of the material or the results which can be used for comparison with other fungicidal and pesticidal mixtures are given in detail.

Example I

In a test to determine fungicidal activity, varying amounts of a polymerized ethylene polysulfide dispersion from which the salts had been removed were incorporated into Difco malt extract agar, the treated agar was poured into Petri dishes, and the nutrient in the dishes was inoculated by spraying with a spore suspension of *Alternaria solani* in some and with a spore suspension of *Sclerotinia fructicola* in others by means of an atomizer. By this treatment, it was found that after incubation for three days at 21° C. none of the spores of either fungus germinated when 100 p. p. m. of the polysulfide polymer were present while 10 p. p. m. effected a 50% control of the growth of *Alternaria solani*.

Example II

Rose plants which were heavily infested with powdery mildew were thoroughly sprayed with dispersions containing 0.1% to 1.0% by weight of polymerized ethylene polysulfide. On observation there was no apparent injury to the plants. After days of observation, it was noted that complete control of the mildew was effected. The mycelia of the fungus on the surface of the older leaves became brown and died. Now new leaves were free from fungus, and were undamaged by repeated treatment with the polymerized ethylene polysulfide.

Example III

These organic polysulfides exhibit some insecticidal power. Sets of 10 *Culex quinquefasciatus* (common mosquito) larvae 5 to 6 days old were placed in duplicate tests at 29° C. in dispersions containing various amounts of ethylene polysulfide polymer. Concentrations of 0.1% by weight and above were the most effective against the larvae. In the test cultures 0.1% by weight of ethylene polysulfide polymer killed 90% of the larvae after 24 hours of incubation.

Aqueous dispersions or emulsions of such organic polysulfide as formed by the reaction of formaldehyde with a water-soluble polysulfide such as sodium polysulfide or by the reaction of olefins and hydrogen sulfide as, for example, ethylene and hydrogen sulfide may be employed as fungicides with equivalent results.

Of the various organic polysulfides available the higher polysulfides, such as the tetrasulfides, are preferred since two of the sulfur atoms of the organic tetrasulfides are quite labile and contribute to fungicidal activity. But the lower sulfides also have fungicidal powers.

The latices, dispersions and/or emulsions of organic polysulfide condensation products, either alone or admixed with the reactant materials from which the polymeric products are formed, may be used for their pesticidal values, for it is not necessary to wash the latex sufficiently to remove volatiles or unreacted inorganic polysulfides present since such volatiles as ethylene dichloride dichloroethyl ether, and formaldehyde are powerful insecticides, while the unreacted inorganic polysulfides may be retained or may be converted to alkaline-earth or heavy metal sulfides of known insecticidal and fungicidal value.

The latex may be applied with or without dilution depending on the purpose for which it is used and the nature of the tissues to which it is applied. Dilution would be necessary for application as a foliage spray. In this case, the water-soluble polysulfide should be used in excess in the preparation of the latex to avoid the presence of such unreacted materials as ethylene dichloride, etc., which would injure the foliage.

In tree surgery, the latex can be applied with a brush to form a continuous rubbery film over cut surfaces which would prevent the entrance of water or insects during the healing process as well as performing as a fungicide to prevent the growth of fungi in or near the wound. This would also be feasible in the treatment of trunks or root crowns of shade trees or fruit trees. In dormant sprays, the film could be either continuous or discontinuous, as desired.

Latices of polymeric organic polysulfides containing unreacted inorganic polysulfides, generally sodium polysulfides, can be treated with barium, copper, cadmium, antimony, lead, etc., salts to produce sulfides of high and low molecular weight to enhance insecticidal and fungicidal activity of the latices. Barium polysulfide is known to be a very effective fungicidal and insecticidal agent. The calcium sulfides and polysulfides are widely used as pesticides also. In lieu of treating with barium or calcium salts, one may substitute their polysulfides for sodium polysulfide in the preparation of the polymeric organic polysulfides.

Latices of polymeric organic polysulfides of high molecular weight can also be used as carriers of organic bases such as nicotine, derivatives of such bases, and other organic insecticides and fungicides, particularly those of high volatility, which are soluble in polymeric organic polysulfides. This enables one to apply volatile insecticides and fungicides and maintain effective lethal concentrations over long periods of time as the nicotine or other volatile agent diffuses slowly from the polymer.

When 0.75 lb. of nicotine sulfate (40% nicotine) was incorporated into 100 gallons of unwashed alkaline polymeric ethylene polysulfide latex containing 0.5% by weight of the polymer and used as a spray against green aphids of apple (var. Red Delicious), the kill was 99% over a period of 2 days as compared with 60% kill for the same spray without the organic polysulfide which is commonly used against these very destructive pests.

Such latices can also be used as carriers of Auxins, growth hormones, and the like, of low or extremely slight solubility in water, for sprays to prevent the premature fall of ripening apples, rooting of woody tissues, etc. as well as mechanical carriers, for they form tenacious deposits with other spray materials such as sulfur, which are then not readily removed by rain, weathering, etc.

The objectives of my invention are evident from the above descriptions and examples which are intended to be illustrative only, for many modifications and variations will be understood by one skilled in the art as being within the spirit and scope of my invention as defined in the appended claim.

I claim:

A composition capable of protecting plant life from destruction by fungi and insects comprising an aqueous dispersion containing a polymeric ethylene polysulfide having a polymer particle size of 1 to 3 microns and having a sulfur content of 80 to 85%, and nicotine sulfate.

WILLIAM D. STEWART.

REFERENCES CITED

The following references are of record in the file of this patent:

UNITED STATES PATENTS

| Number | Name | Date |
| --- | --- | --- |
| Re. 19,207 | Patrick | June 12, 1934 |
| 1,002,247 | Ellis | Sept. 5, 1911 |
| 1,854,423 | Patrick | Apr. 19, 1932 |
| 1,890,158 | Lindstaedt | Dec. 6, 1932 |
| 1,973,910 | Peterson | Sept. 18, 1934 |
| 2,100,351 | Patrick | Nov. 30, 1937 |
| 2,102,564 | Bonstein | Dec. 14, 1937 |
| 2,110,074 | Arnold | Mar. 1, 1938 |
| 2,145,259 | Heath | Jan. 31, 1939 |
| 2,203,274 | Anderson | June 4, 1940 |
| 2,206,643 | Patrick | July 2, 1940 |